US011023576B2

(12) United States Patent
Griffin et al.

(10) Patent No.: US 11,023,576 B2
(45) Date of Patent: Jun. 1, 2021

(54) DETECTING MALICIOUS ACTIVITY ON A COMPUTER SYSTEM

(71) Applicant: INTERNATIONAL BUSINESS MACHINES CORPORATION, Armonk, NY (US)

(72) Inventors: Adam L. Griffin, Dubuque, IA (US); Christopher D. Scott, Santa Ana, CA (US); Mary E. Rudden, Denver, CO (US); Craig M. Trim, Ventura, CA (US); Rhonda L. Childress, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 16/202,149

(22) Filed: Nov. 28, 2018

(65) Prior Publication Data

US 2020/0167464 A1 May 28, 2020

(51) Int. Cl.
*G06F 21/55* (2013.01)
*G06N 3/08* (2006.01)
(Continued)

(52) U.S. Cl.
CPC ........ *G06F 21/552* (2013.01); *G06F 16/9027* (2019.01); *G06F 21/554* (2013.01);
(Continued)

(58) Field of Classification Search
CPC .... G06F 21/552; G06F 16/9027; G06F 40/20; G06F 21/554; G06F 21/563; G06F 21/566; G06N 3/0481; G06N 3/08; G10L 13/08
(Continued)

(56) References Cited

U.S. PATENT DOCUMENTS 7,225,343 B1\* 5/2007 Honig ................... G06N 7/005
713/194
7,305,385 B1\* 12/2007 Dzikiewicz ............... G06F 7/02
707/745
(Continued)

OTHER PUBLICATIONS

Isohara, Takamasa et al.; Kernel-based behavior analysis for android malware detection; 2011 Seventh International Conference on Computational Intelligence and Security (CIS); Dec. 3-4, 2011; pp. 1011-1015.
(Continued)

*Primary Examiner* — Shahriar Zarrineh
(74) *Attorney, Agent, or Firm* — Schmeiser, Olsen & Watts; William H. Hartwell

(57) ABSTRACT

An approach is provided for detecting a malicious activity on a computer system. First process trees are identified for computer processes that have been executed on a computer system. Each of the first process trees are vectorized. The vectorized first process trees are associated with respective labels. Each label represents an amount by which a respective vectorized process tree reflects the malicious activity. An artificial neural network is trained by using the vectorized first process trees and the associated labels as training input. After the training of the artificial neural network is completed, second process trees for currently executing computer processes are vectorized and provided as input vectors to the artificial neural network. Responsive to the artificial neural network providing an output indicating that a combination of the input vectors indicates the malicious activity, a remedial action is performed.

14 Claims, 3 Drawing Sheets

(51) Int. Cl.
*G06N 3/04* (2006.01)
*G06F 16/901* (2019.01)
*G06F 21/56* (2013.01)
*G10L 13/08* (2013.01)
*G06F 40/20* (2020.01)

(52) U.S. Cl.
CPC .......... *G06F 21/563* (2013.01); *G06F 21/566* (2013.01); *G06F 40/20* (2020.01); *G06N 3/0481* (2013.01); *G06N 3/08* (2013.01); *G10L 13/08* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 8,418,249 | B1* | 4/2013 | Nucci | H04L 63/1416 |
| | | | | 726/23 |
| 8,762,298 | B1* | 6/2014 | Ranjan | G06F 21/552 |
| | | | | 706/12 |
| 8,826,439 | B1* | 9/2014 | Hu | G06F 21/56 |
| | | | | 726/24 |
| 9,203,854 | B2* | 12/2015 | Friedrichs | H04L 63/1416 |
| 9,531,736 | B1* | 12/2016 | Torres | H04L 63/1441 |
| 9,699,205 | B2* | 7/2017 | Muddu | G06F 40/134 |
| 9,721,097 | B1* | 8/2017 | Davis | G06N 3/0445 |
| 9,813,310 | B1* | 11/2017 | Sieracki | H04L 43/18 |
| 9,819,689 | B2* | 11/2017 | Chandola | G06F 16/2455 |
| 10,230,749 | B1* | 3/2019 | Rostami-Hesarsorkh | |
| | | | | G06F 21/56 |
| 10,635,813 | B2* | 4/2020 | Saxe | G06N 3/084 |
| 10,671,726 | B1* | 6/2020 | Paithane | G06F 21/562 |
| 10,699,009 | B2* | 6/2020 | Scherman | H04L 63/1416 |
| 10,726,128 | B2* | 7/2020 | Krasser | G06N 7/005 |
| 2007/0192863 | A1* | 8/2007 | Kapoor | H04L 67/10 |
| | | | | 726/23 |
| 2008/0184367 | A1* | 7/2008 | McMillan | G06F 21/563 |
| | | | | 726/23 |
| 2012/0260342 | A1* | 10/2012 | Dube | G06F 21/564 |
| | | | | 726/24 |
| 2014/0090061 | A1* | 3/2014 | Avasarala | G06F 21/56 |
| | | | | 726/24 |
| 2014/0157414 | A1* | 6/2014 | Antonakakis | H04L 63/1483 |
| | | | | 726/23 |
| 2014/0223553 | A1* | 8/2014 | Gupta | G06F 21/52 |
| | | | | 726/22 |
| 2014/0279763 | A1* | 9/2014 | Madnani | G06Q 10/10 |
| | | | | 706/12 |
| 2015/0026810 | A1* | 1/2015 | Friedrichs | H04L 63/1416 |
| | | | | 726/23 |
| 2016/0121229 | A1* | 5/2016 | Guo | A63H 30/04 |
| | | | | 446/175 |
| 2016/0151918 | A1* | 6/2016 | Stoyanchev | G06F 40/30 |
| | | | | 700/246 |
| 2016/0156643 | A1* | 6/2016 | Choi | H04L 63/1416 |
| | | | | 726/23 |
| 2016/0241574 | A1* | 8/2016 | Kumar | H04L 63/1408 |
| 2016/0306971 | A1* | 10/2016 | Anderson | G06N 20/00 |
| 2016/0337390 | A1* | 11/2016 | Sridhara | H04L 63/101 |
| 2017/0024660 | A1* | 1/2017 | Chen | G06N 5/045 |
| 2017/0032279 | A1* | 2/2017 | Miserendino | G06N 5/04 |
| 2017/0111515 | A1* | 4/2017 | Bandyopadhyay | H04M 3/527 |
| 2017/0134397 | A1* | 5/2017 | Dennison | G06F 21/566 |
| 2017/0142140 | A1* | 5/2017 | Muddu | H04L 63/06 |
| 2017/0251003 | A1* | 8/2017 | Rostami-Hesarsorkh | |
| | | | | H04L 63/1425 |
| 2018/0018456 | A1* | 1/2018 | Chen | G06F 21/552 |
| 2018/0020024 | A1* | 1/2018 | Chao | G06F 17/18 |
| 2018/0032876 | A1* | 2/2018 | Altshuller | G06N 20/00 |
| 2018/0069893 | A1* | 3/2018 | Amit | G06F 21/554 |
| 2018/0211040 | A1* | 7/2018 | Patton | G06F 21/568 |
| 2018/0293381 | A1* | 10/2018 | Tseng | G06F 21/566 |
| 2018/0314983 | A1* | 11/2018 | Sai | G06N 3/02 |
| 2019/0018960 | A1* | 1/2019 | Chistyakov | G06N 20/00 |
| 2019/0026466 | A1* | 1/2019 | Krasser | G06F 21/565 |
| 2019/0114539 | A1* | 4/2019 | Chistyakov | G06N 3/08 |
| 2019/0164086 | A1* | 5/2019 | Amit | H04L 63/1466 |
| 2019/0164159 | A1* | 5/2019 | Ponniah | G06Q 20/407 |
| 2019/0207969 | A1* | 7/2019 | Brown | G06F 21/552 |
| 2019/0379696 | A1* | 12/2019 | Ludwig | H04L 63/1433 |
| 2020/0004961 | A1* | 1/2020 | Prokudin | G06F 21/567 |
| 2020/0076840 | A1* | 3/2020 | Peinador | G06F 16/80 |
| 2020/0153863 | A1* | 5/2020 | Wiener | H04W 4/60 |
| 2020/0186548 | A1* | 6/2020 | Alagar | G06N 3/08 |
| 2020/0210577 | A1* | 7/2020 | Chistyakov | G06F 21/52 |
| 2020/0364338 | A1* | 11/2020 | Ducau | G06F 21/563 |

OTHER PUBLICATIONS

Aswini, A. M., et al.; Droid permission miner: Mining prominent permissions for Android malware analysis; Fifth International Conference on the Applications of Digital Information and Web Technologies (ICADIWT 2014); Feb. 17-19, 2014; pp. 81-86.

Dolgikh, Andrey, et al.; Using behavioral modeling and customized normalcy profiles as protection against targeted cyber-attacks; 5th International Conference on Mathematical Methods, Models, and Architectures for Computer Network Security; Sep. 8-10, 2012; pp. 191-202.

Marschalek, Stefan et al.; Classifying malicious system behavior using event propagation trees; Proceedings of the 17th International Conference on Information Integration and Web-based Applications & Services; Dec. 11-13, 2015; 10 pages.

Wagner, Cynthia et al. Malware analysis with graph kernels and support vector machines; 2009 4th International Conference on Malicious and Unwanted Software (MALWARE); Oct. 13-14, 2009; pp. 63-68.

* cited by examiner

DETECTING MALICIOUS ACTIVITY ON A COMPUTER SYSTEM

BACKGROUND

The present invention relates to computer security, and more particularly to malicious activity detection and remediation.

Known antivirus platforms include signature-based and/or heuristic-based programs used to prevent, detect, and remove malware. Trained professionals study malware and manually build a heuristic that can react to the threat. The AV-TEST organization registers over 250,000 new malicious programs every day. Conventional computer security techniques detect known cyber-attacks by using preconfigured tooling and can include collecting and analyzing data in log files from network devices, host assets, and operating systems. Conventional computer security techniques identify possible malicious activities by employing a rule-based or a statistical correlation engine to determine associations between events in a computer system, or by analyzing user activities and behaviors.

SUMMARY

In one embodiment, the present invention provides a computer-implemented method of detecting a malicious activity on a computer system. The method includes identifying, by one or more processors, first process trees for a plurality of computer processes that have executed on a computer system. The method further includes vectorizing, by the one or more processors, each of the first process trees and associating, by the one or more processors, the vectorized first process trees with respective labels. Each label represents an amount by which a respective vectorized process tree included in the vectorized first process trees reflects the malicious activity. The method further includes training, by the one or more processors, an artificial neural network by using the vectorized first process trees and the associated labels as training input. The method further includes vectorizing, by the one or more processors and after a completion of the training of the artificial neural network, second process trees for computer processes that are currently executing on the computer system. The method further includes providing, by the one or more processors, the vectorized second process trees as input vectors to the artificial neural network. The method further includes in response to the artificial neural network providing an output indicating that a combination of the input vectors indicates the malicious activity, performing, by the one or more processors, a remedial action for the malicious activity.

In another embodiment, the present invention provides a computer program product for detecting a malicious activity on a computer system. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes identifying, by the first computer system, first process trees for a plurality of computer processes that have executed on a second computer system. The method further includes vectorizing, by the first computer system, each of the first process trees and associating, by the first computer system, the vectorized first process trees with respective labels. Each label represents an amount by which a respective vectorized process tree included in the vectorized first process trees reflects the malicious activity. The method further includes training, by the first computer system, an artificial neural network by using the vectorized first process trees and the associated labels as training input. The method further includes vectorizing, by the first computer system and after a completion of the training of the artificial neural network, second process trees for computer processes that are currently executing on the second computer system. The method further includes providing, by the first computer system, the vectorized second process trees as input vectors to the artificial neural network. The method further includes in response to the artificial neural network providing an output indicating that a combination of the input vectors indicates the malicious activity, performing, by the first computer system, a remedial action for the malicious activity.

In another embodiment, the present invention provides a first computer system including a central processing unit (CPU); a memory coupled to the CPU; and a computer readable storage medium coupled to the CPU. The computer readable storage medium contains instructions that are executed by the CPU via the memory to implement a method of detecting a malicious activity on a second computer system. The method includes identifying, by the first computer system, first process trees for a plurality of computer processes that have executed on a second computer system. The method further includes vectorizing, by the first computer system, each of the first process trees and associating, by the first computer system, the vectorized first process trees with respective labels. Each label represents an amount by which a respective vectorized process tree included in the vectorized first process trees reflects the malicious activity. The method further includes training, by the first computer system, an artificial neural network by using the vectorized first process trees and the associated labels as training input. The method further includes vectorizing, by the first computer system and after a completion of the training of the artificial neural network, second process trees for computer processes that are currently executing on the second computer system. The method further includes providing, by the first computer system, the vectorized second process trees as input vectors to the artificial neural network. The method further includes in response to the artificial neural network providing an output indicating that a combination of the input vectors indicates the malicious activity, performing, by the first computer system, a remedial action for the malicious activity.

DETAILED DESCRIPTION

Overview

Figure 1:
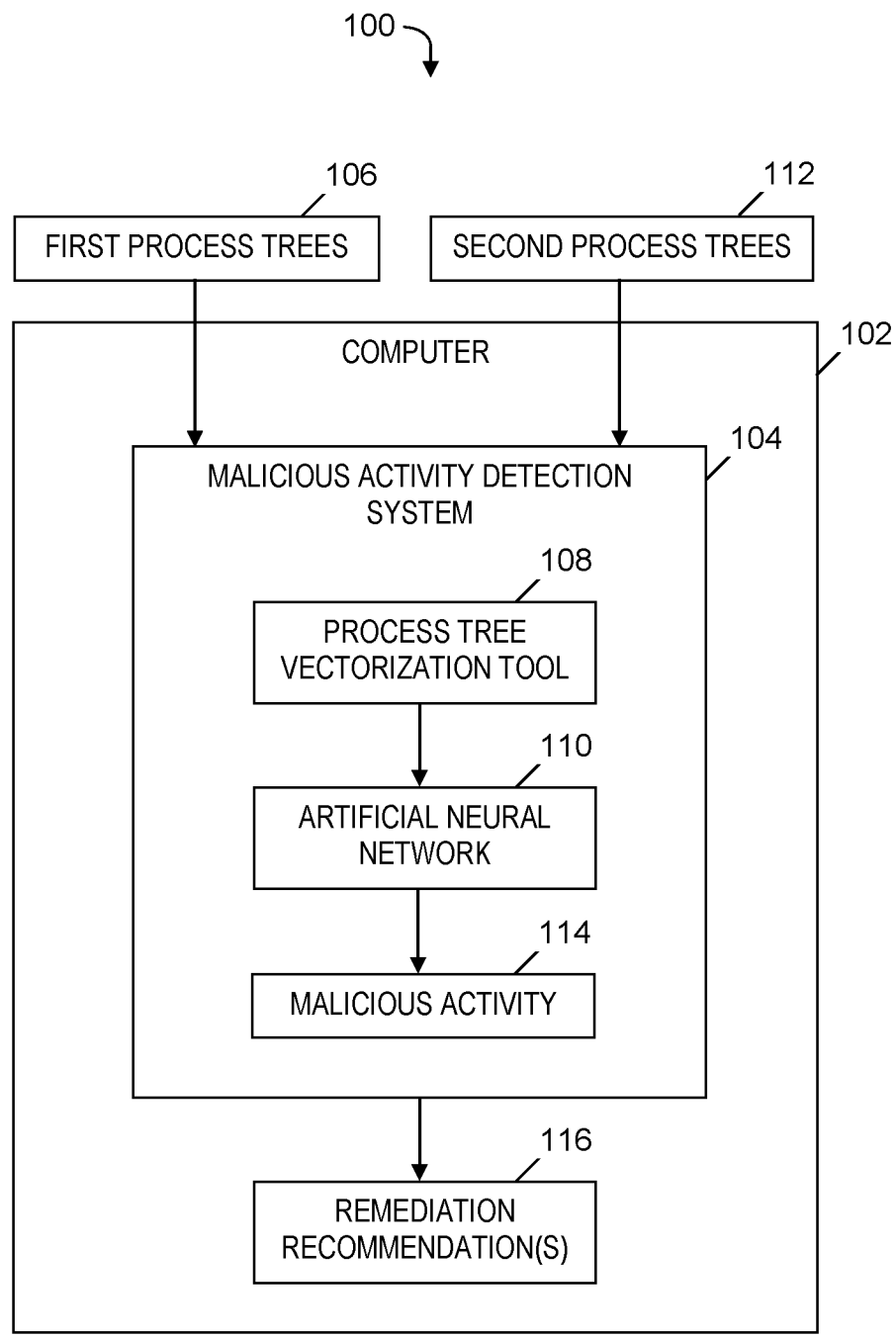
FIG. 1 is a block diagram of a system for detecting a malicious activity on a computer system, in accordance with embodiments of the present invention.

Conventional antivirus techniques are reactive and based on known samples of malware. These conventional techniques lack the ability to detect malicious activity that is not known and that indicates an increase in a threat level. Due to the significant number of new malicious programs being registered each day, manual registration and classification is not a sustainable approach. The time taken by an enterprise to react to malicious activity using conventional techniques is not close to a response time that would be required to safeguard information technology (IT) infrastructure. Malicious activity can affect thousands of servers and freeze or otherwise cripple computer systems within two or three hours, while sampling, submitting, creating, and distributing virus signature files may take days. Known manual threat analysis including incident triage, investigation and impact assessment, and remediation may take weeks or months to complete. Internal delays, corporate inefficiencies, and the need for executive approvals may add to the delays in responding to a cyberattack and increase the cost of the response. While the lengthy response to the cyberattack is occurring, a new variant of malware may be released by a command and control hacker team, which causes the cycle to repeat, causing additional costs and reputational damage.

Embodiments of the present invention address the unique challenges of the conventional computer security techniques by applying knowledge of an attack lifecycle to determine that a cyberattack is happening early in the phases of a model of cyber intrusion (hereinafter, referred to as a termination chain) based on an identification of an escalation of the threat. For example, an initial stage of the cyberattack is recognized and a remediation action is taken before the delivery, exploitation, installation, command and control, or actions on objective phase of the termination chain is completed, thereby minimizing the number of systems affected by the cyberattack. In one embodiment, new cyberattack methodologies are learned, and that learning is applied to previously unseen datasets.

Computer processes, such as launching applications and the order in which they execute, belong to the realm of unstructured and non-sequential data and can be analogized to a sentence in a natural language. A natural language sentence has multiple words strung together which require a syntactic disposition of nouns and verbs and other parts of speech. Specific parts of speech function as glue words that attach tokens with a higher semantic representation together in a coherent manner. Due to the complicated nature of a natural language, no single grammar can describe all possible variants. The analogous language of computer processes requires a syntactic and sematic grammatical order. Sequencing of computer processes may be capable of non-finite variation, but there are still meta-level (i.e., grammatical) requirements for invocation of the processes. In one embodiment, an augmented threat detection system learns the language of computer process execution and applies that learning to threat detection.

In one embodiment, an augmented threat response system generates a process tree, creates an embedding vector for each detailed process taxonomy of the process tree (i.e., vectorizes the process taxonomies), associates the taxonomies with running processes, and analyzes each process sub-tree and associated sub-trees to proactively determine whether the sub-trees represent a contextual sub-task that has the capability for malicious behavior (i.e., to recognize a threat vector).

In one embodiment, an augmented threat response system uses predictive models to analyze network traffic in real time to find imminent threats and allow immediate action. In one embodiment, the augmented threat response system mines historical information to find previously undetected malicious occurrences.

System for Detecting Malicious Activity

FIG. 1 is a block diagram of a system 100 for detecting a malicious activity on a computer system, in accordance with embodiments of the present invention. System 100 includes a computer 102 which executes a software-based malicious activity detection system 104. Malicious activity detection system 104 receives process trees 106 that specify computer processes that were previously executed on one or more computers. Alternatively, malicious activity detection system 104 generates or identifies process trees 106 based on the computer processes that were previously executed.

Malicious activity detection system 104 uses a process tree vectorization tool 108 to generate an embedding vector for each of the process trees 106 (i.e., vectorizes each of the process trees 106). The embedding vectors are also referred to herein as vectorized process trees (not shown). Each process sub-tree included in the vectorized process trees represents a contextual sub-task that may have the capability for malicious behavior. An artificial neural network 110 receives the vectorized process trees from process tree vectorization tool 108 as training input for a training of the artificial neural network 110.

After the training of the artificial neural network 110 is completed, malicious activity detection system 104 receives process trees 112 that specify other computer processes that are currently executing on another computer (not shown) and process tree vectorization tool 108 vectorizes process trees 112 to generate additional vectorized process trees. Process tree vectorization tool 108 sends the additional vectorized process trees as input vectors to artificial neural network 110, which subsequently generates an output indicating that one or more of the additional vectorized process trees indicates a malicious activity 114 and generates remediation recommendation(s) 116 (i.e., recommendation(s) to correct or prevent computer system damage, disruption, or misappropriation based on malicious activity 114).

Figure 2:
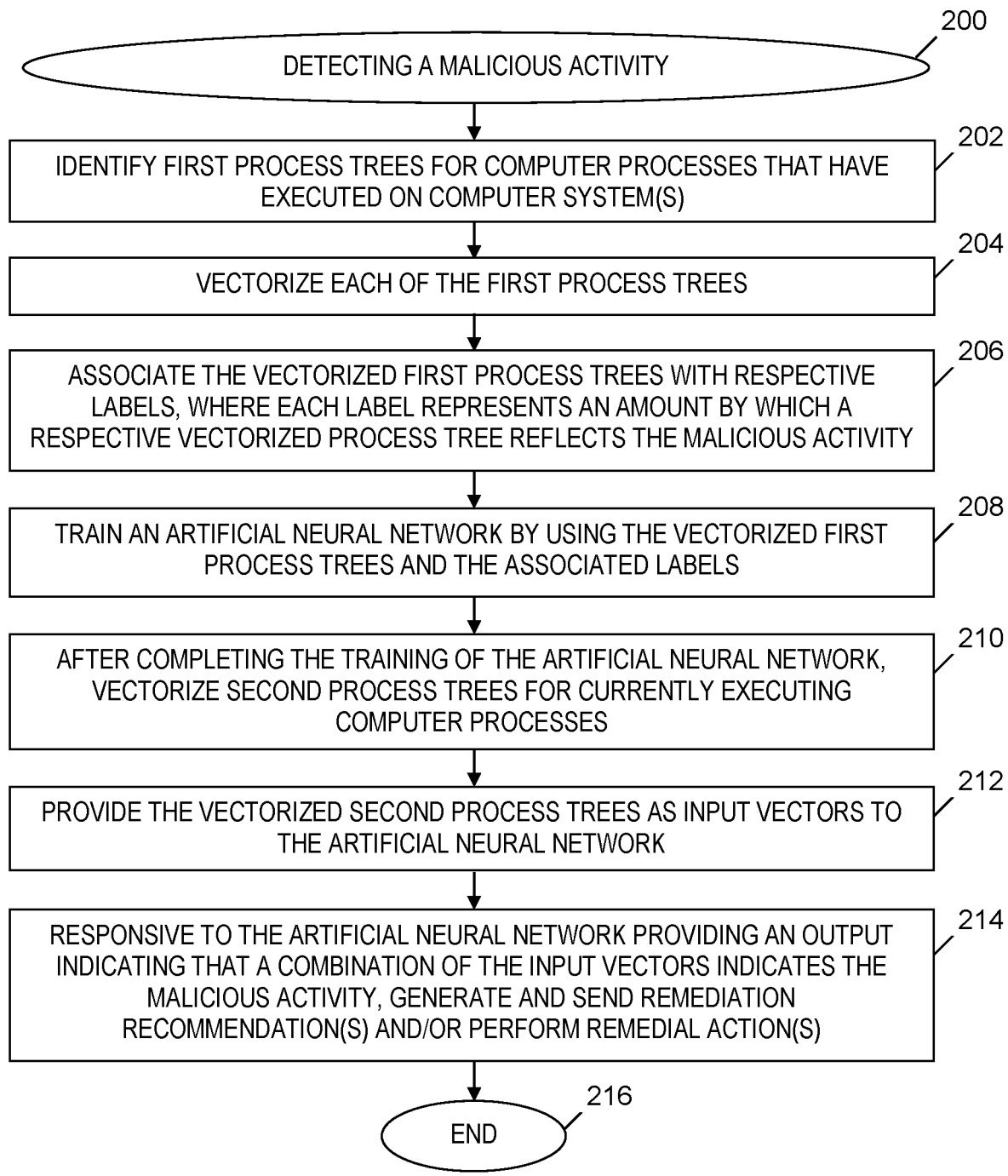
FIG. 2 is a flowchart of a process of detecting a malicious activity on a computer system, where the process is implemented in the system of FIG. 1, in accordance with embodiments of the present invention.
Figure 3:
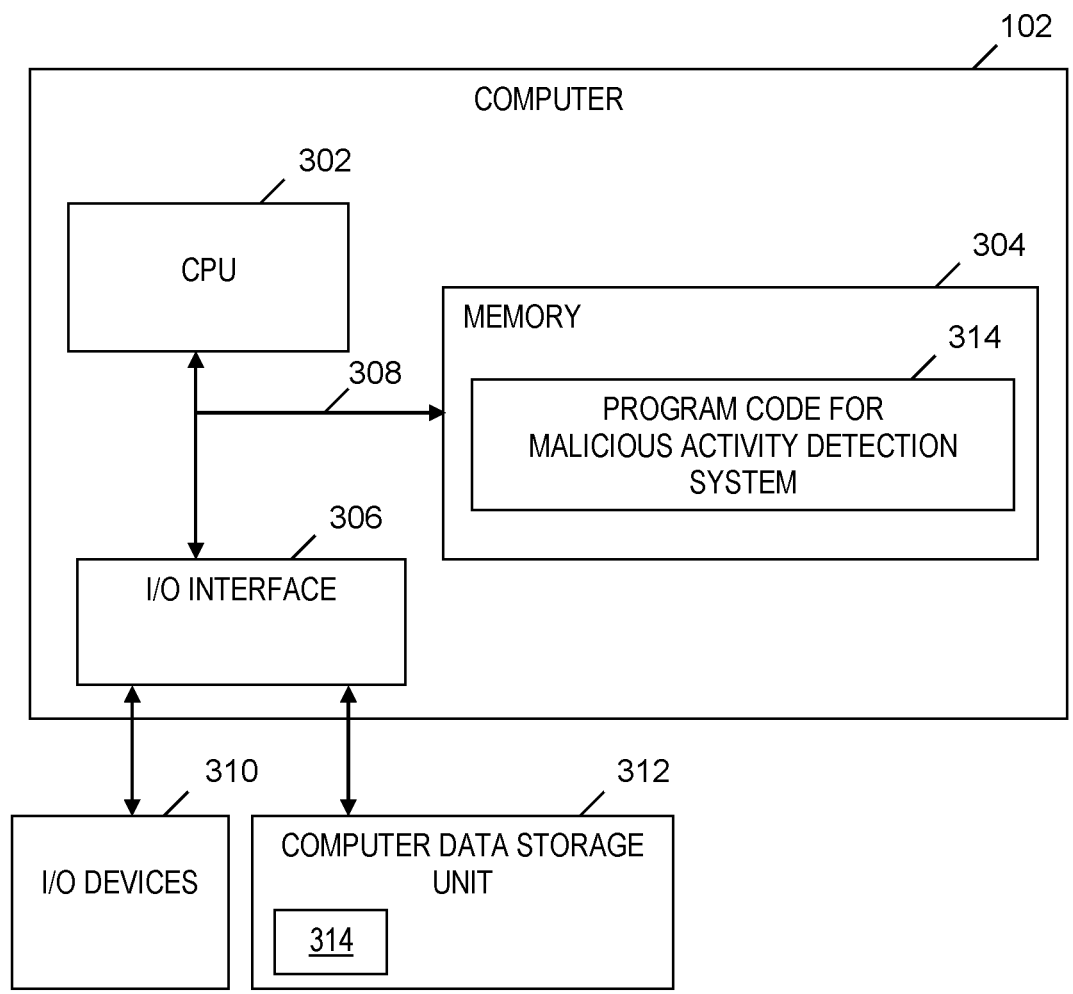
FIG. 3 is a block diagram of a computer included in the system of FIG. 1 and that implements the process of FIG. 2, in accordance with embodiments of the present invention.

The functionality of the components shown in FIG. 1 is described in more detail in the discussion of FIG. 2 and FIG. 3 presented below.

Process for Detecting Malicious Activity

FIG. 2 is a flowchart of a process of detecting a malicious activity on a computer system, where the process is implemented in the system of FIG. 1, in accordance with embodiments of the present invention. The process of FIG. 2 starts at step 200. In step 202, malicious activity detection system 104 (see FIG. 1) identifies first process trees 106 (see FIG. 1) that specify computer processes that previously have been executed on one or more computer systems.

In step 204, malicious activity detection system 104 (see FIG. 1) vectorizes each process tree included in the first process trees 106 (see FIG. 1) to generate vectorized first process trees. In one embodiment, process tree vectorization tool 108 (see FIG. 1) performs step 204.

In step 206, malicious activity detection system 104 (see FIG. 1) associates the vectorized first process trees with respective labels. Each label represents an amount by which a respective vectorized first process tree reflects (i.e., indicates) the malicious activity 114 (see FIG. 1).

In step 208, malicious activity detection system 104 (see FIG. 1) trains artificial neural network 110 (see FIG. 1) by using the vectorized first process trees generated in step 204 and the labels associated with the vectorized first process trees in step 206.

Step 210 is performed after the training of the artificial neural network 110 (see FIG. 1) is completed. In step 210, malicious activity detection system 104 (see FIG. 1) vectorizes second process trees 112 (see FIG. 1), which specify computer processes that are currently being executed in computer 102 (see FIG. 1) or in a computer (not shown in FIG. 1) other than computer 102 (see FIG. 1). The vectorizing in step 210 results in vectorized second process trees. In one embodiment, process tree vectorization tool 108 (see FIG. 1) performs step 210.

In one embodiment, malicious activity detection system 104 (see FIG. 1) receives data specifying first process trees 106 (see FIG. 1) and second process trees 112 (see FIG. 1) from data flows from osquery, an endpoint detection and response system, or a threat intelligence feed.

In step 212, malicious activity detection system 104 (see FIG. 1) provides the vectorized second process trees as input vectors to artificial neural network 110. In one embodiment, process tree vectorization tool 108 (see FIG. 1) performs step 212.

After step 212 and prior to step 214, artificial neural network 110 (see FIG. 1) provides an output indicating that a combination of the input vectors provided in step 212 indicates the malicious activity 114 (see FIG. 1). In step 214, responsive to artificial neural network 110 (see FIG. 1) providing the aforementioned output, malicious activity detection system 104 (see FIG. 1) generates and sends (or otherwise presents) remediation recommendation(s) 116 (see FIG. 1) and/or performs remedial action(s) based on remediation recommendation(s) 116 (see FIG. 1).

In one embodiment, malicious activity detection system 104 (see FIG. 1) sends remediation recommendation(s) 116 (see FIG. 1) to a human analyst for approval. Responsive to receiving the approval for one or more of the remediation recommendation(s) 116 (see FIG. 1), malicious activity detection system 104 (see FIG. 1) performs remedial action(s) to implement the approved remediation recommendation(s).

In one embodiment, performing the remedial action in step 214 includes malicious activity detection system 104 (see FIG. 1) proactively preventing subsequent malicious activity in the computer system by preventing a completion of a subsequent computer process that performs the subsequent malicious activity.

After step 214, the process of FIG. 2 ends at step 216.

The vectorizing or process trees in step 204 and step 210 creates embedding vectors (i.e., process embeddings) that provide a compact representation of computer processes and the relative meanings of the computer processes. The process embeddings are an improvement over sparse representations used in heuristic representation. In one embodiment, malicious activity detection system 104 (see FIG. 1) learns the process embeddings from first and second process trees 106 and 112 (see FIG. 1) and may reuse the process embeddings among projects. Alternatively, malicious activity detection system 104 (see FIG. 1) learns the process embeddings as part of fitting a neural network on text data. In one embodiment, malicious activity detection system 104 (see FIG. 1) uses an embedding layer for neural networks on the first and second process trees 106 and 112 (see FIG. 1). In one embodiment, malicious activity detection system 104 (see FIG. 1) requires that data from the first and second process trees 106 and 112 (see FIG. 1) be integer encoded so that a unique integer represents each process. In one embodiment, this data preparation step is performed by an application programming interface (API) that tokenizes a text corpus (e.g., the Tokenizer API provided by the Keras open source neural network library). In one embodiment, malicious activity detection system 104 (see FIG. 1) initializes an embedding layer with random weights and learns an embedding for all the processes in a training dataset. The embedding layer is defined as the first hidden layer of artificial neural network 110 (see FIG. 1). The embedding layer specifies three arguments:

1. input_dim: the size of the vocabulary in the process tree data. For example, if the data is integer encoded to values in the range 0 to 10, inclusive, then the size of the vocabulary is 11 elements.

2. output_dim: the size of the vector space in which the computer processes will be embedded. Output_dim defines the size of output vectors from the embedding layer for each process. For example, output_dim can be 32, 100, or larger.

3. input length: the length of input sequences, as defined for any input layer of a Keras model or a similar model. For example, if all the computer processes in the process tree are comprised of 1000 elements, then input length is 1000.

In one embodiment, step 208 includes malicious activity detection system 104 (see FIG. 1) (1) determining a language of a first computer process based on one or more computer-based actions indicated by one or more sub-trees within a first process tree included in the first process trees 106 (see FIG. 1), (2) determining that the language of the first computer process indicates the malicious activity 114 (see FIG. 1), (3) after the training of the artificial neural network is completed, determining a language of a second computer process based on one or more other computer-based actions indicated by one or more other sub-trees within a second process tree included in the second process trees 112 (see FIG. 1), and (4) determining that the language of the first computer process matches the language of the second computer process and performing the remedial action(s) is based on the language of the first computer process (i) indicating the malicious activity 114 (see FIG. 1) and (ii) matching the language of the second computer process.

In one embodiment, based on the language of the aforementioned second computer process, malicious activity detection system 104 (see FIG. 1) uses a natural language generation engine to generate a text in a natural language that includes a description of the malicious activity 114 (see FIG. 1) based on the one or more other computer-based actions and malicious activity detection system 104 (see FIG. 1) generates an alert that includes the text in the natural language that includes the description of the malicious activity 114 (see FIG. 1) and sends the alert to another computer system for viewing by a human analyst. The alert includes one or more remedial actions to address the malicious activity 114 (see FIG. 1).

In one embodiment, based on the language of the aforementioned second computer process, malicious activity detection system 104 (see FIG. 1) (1) uses a natural language generation engine to generate a text in a natural language that includes a description of the malicious activity based on the one or more other computer-based actions, (2) converts the text into a voice message, (3) sends the voice message to a computer system for presentation to a human analyst, where the voice message includes one or more remedial actions to address the malicious activity 114 (see FIG. 1), and (4) receives an approval of the remedial action, where performing the remedial action(s) in step 214 is performed automatically in response to the step of receiving the approval.

In one embodiment, step 206 includes malicious activity detection system 104 (see FIG. 1) mapping the first process trees to first text in a natural language, and step 210 includes malicious activity detection system 104 (see FIG. 1) mapping the second process trees to second text in the natural language.

In one embodiment, malicious activity detection system 104 (see FIG. 1) (1) configures attributes of the remedial action(s) in one or more policies and (2) determines that an amount of risk associated with the malicious activity exceeds a threshold amount of risk, where performing the remedial action(s) in step 214 is performed automatically based on (i) the one or more policies and (ii) the amount of risk exceeding the threshold amount of risk.

EXAMPLES

In the vectorization in steps 206 and 212 (see FIG. 2), malicious activity detection system 104 (see FIG. 1) analyzes data in a process tree included in first process trees 106 (see FIG. 1) or second process trees 112 (see FIG. 1) and determines whether a threat vector is present. As a first example, malicious activity detection system 104 (see FIG. 1) determines that a process tree indicates the following computer process language:

User user1 launches winword.exe

In the first example, malicious activity detection system 104 (see FIG. 1) determines that the computer process language presented above is mapped to the following human language:

"user1 has just started Microsoft® Word"

Microsoft is a registered trademark of Microsoft Corporation located in Seattle, Wash.

As a second example, malicious activity detection system 104 (see FIG. 1) determines that a process tree indicates the following computer process language:

"User user1 launches winword.exe and cmd.exe launches with elevated privileges in the same process tree. An unsigned dynamic link library (DLL) is loaded into lsass.exe."

In the second example, malicious activity detection system 104 (see FIG. 1) determines that the computer process language presented above is mapped to the following human language:

"Your PC user credentials have just been stolen by an attacker"

In the first and second examples presented above, malicious activity detection system 104 (see FIG. 1) analyzes the processes as the processes are initiated and in the context of their associated process trees to determine whether there is a match to one of thirteen known methods of stealing user credentials from a Microsoft® Windows® system. Windows is a registered trademark of Microsoft Corporation. In the case of the second example presented above, malicious activity detection system 104 (see FIG. 1) identifies suspicious activity and determines the correct termination point within the complexity of multiple process trees to halt suspicious activity (e.g., determine the point at which to shut down a computer process to avoid or minimize damage done by malicious activity that follows the identified suspicious activity). In the second example, malicious activity detection system 104 (see FIG. 1) may determine that it is sufficient to terminate the command prompt as a remedial action because in previously analyzed process trees that included the launch of winword.exe without the cmd.exe being launched with elevated privileges (i.e., similar to the first example presented above) did not indicate a risk of a malicious activity.

In a third example, malicious activity detection system 104 (see FIG. 1) is coupled to Havyn, a voice assistant for cybersecurity. The third example includes the following steps:

1. Malicious activity detection system 104 (see FIG. 1) detects a Command Shell executing under a Microsoft® Word process 2. Malicious activity detection system 104 (see FIG. 1) detects the Command Shell elevated to SYSTEM level privileges 3. Malicious activity detection system 104 (see FIG. 1) detects a Credential Theft 4. Malicious activity detection system 104 (see FIG. 1) determines that the theft is malicious based on data in an associated process tree 5. Malicious activity detection system 104 (see FIG. 1) sends an alert via Havyn 6. Havyn picks up the alert and notifies a human analyst via voice:

"I have detected a malicious credential theft on host <hostname>"

"I recommend the following remediation actions:"

"Contain <hostname>"

"Reset the following credentials . . . " (i.e., indicating not all the credentials, but only the credentials that malicious activity detection system 104 (see FIG. 1) determined were affected)

"Initiate a patch push for Microsoft Word and send that to <identification numbers of endpoints affected by the vulnerability>"

7. The human analyst vocally approves the remediation actions via Havyn

8. Havyn initiates the remediation actions via API calls, except for any remediation action that requires higher approval(s). For a remediation action that requires a higher approval, malicious activity detection system 104 (see FIG. 1) sends a request for approval to an appropriate approver and in response to receiving the appropriate approval, initiates the remediation action via an API call.

Computer System

FIG. 3 is a block diagram of a computer included in the system of FIG. 1 and that implements the process of FIG. 2, in accordance with embodiments of the present invention. Computer 102 is a computer system that generally includes a central processing unit (CPU) 302, a memory 304, an input/output (I/O) interface 306, and a bus 308. Further, computer 102 is coupled to I/O devices 310 and a computer data storage unit 312. CPU 302 performs computation and control functions of computer 102, including executing instructions included in program code 314 for malicious activity detection system 104 (see FIG. 1) to perform a method of detecting a malicious activity in a computer system, where the instructions are executed by CPU 302 via memory 304. CPU 302 may include a single processing unit or be distributed across one or more processing units in one or more locations (e.g., on a client and server).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems in various forms. Further, memory 304 can include data distributed across, for example, a local area network (LAN) or a wide area network (WAN).

I/O interface 306 includes any system for exchanging information to or from an external source. I/O devices 310 include any known type of external device, including a display, keyboard, etc. Bus 308 provides a communication link between each of the components in computer 102, and may include any type of transmission link, including electrical, optical, wireless, etc.

I/O interface 306 also allows computer 102 to store information (e.g., data or program instructions such as program code 314) on and retrieve the information from computer data storage unit 312 or another computer data storage unit (not shown). Computer data storage unit 312 includes a known computer readable storage medium, which is described below. In one embodiment, computer data storage unit 312 is a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 314 that includes instructions that are executed by CPU 302 via memory 304 to detect a malicious activity in a computer system. Although FIG. 3 depicts memory 304 as including program code, the present invention contemplates embodiments in which memory 304 does not include all of code 314 simultaneously, but instead at one time includes only a portion of code 314.

Further, memory 304 may include an operating system (not shown) and may include other systems not shown in FIG. 3.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to detecting a malicious activity in a computer system. Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 102) including one or more processors (e.g., CPU 302), wherein the processor(s) carry out instructions contained in the code causing the computer system to detect a malicious activity in a computer system. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of detecting a malicious activity in a computer system.

While it is understood that program code 314 for detecting a malicious activity in a computer system may be deployed by manually loading directly in client, server and proxy computers (not shown) via loading a computer readable storage medium (e.g., computer data storage unit 312), program code 314 may also be automatically or semi-automatically deployed into computer 102 by sending program code 314 to a central server or a group of central servers. Program code 314 is then downloaded into client computers (e.g., computer 102) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider can offer to create, maintain, support, etc. a process of detecting a malicious activity in a computer system. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 304 and computer data storage unit 312) having computer readable program instructions 314 thereon for causing a processor (e.g., CPU 302) to carry out aspects of the present invention.

The computer readable storage medium can be a tangible device that can retain and store instructions (e.g., program code 314) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 102) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, switches, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of detecting a malicious activity on a computer system, the method comprising:

identifying, by one or more processors, first process trees for a plurality of computer processes that have executed on a computer system;

vectorizing, by the one or more processors, each of the first process trees and associating, by the one or more processors, the vectorized first process trees with respective labels, each label representing an amount by which a respective vectorized process tree included in the vectorized first process trees reflects the malicious activity;

training, by the one or more processors, an artificial neural network by using the vectorized first process trees and the associated labels as training input;

vectorizing, by the one or more processors and after a completion of the training of the artificial neural network, second process trees for computer processes that are currently executing on the computer system, and providing, by the one or more processors, the vectorized second process trees as input vectors to the artificial neural network;

in response to the artificial neural network providing an output indicating that a combination of the input vectors indicates the malicious activity, performing, by the one or more processors, a remedial action for the malicious activity;

determining, by the one or more processors and during the training the artificial neural network, a language of a first computer process based on one or more computer-based actions indicated by one or more sub-trees within a first process tree included in the first process trees, the language of the first computer process including a specification of a first launching application and a first order of first tasks performed by the first computer process;

determining, by the one or more processors, that the language of the first computer process indicates the malicious activity;

determining, by the one or more processors, a language of a second computer process based on one or more other computer-based actions indicated by one or more other sub-trees within a second process tree included in the second process trees, the language of the second computer process including a specification of a second launching application and a second order of second tasks performed by the second computer process;

determining, by the one or more processors, that the language of the first computer process matches the language of the second computer process by determining that the first launching application matches the second launching application and the first order of the first tasks matches the second order of the second tasks, wherein the performing the remedial action is based on the language of the first computer process indicating the malicious activity and matching the language of the second computer process;

based on the language of the second computer process, generating, by the one or more processors and using a natural language generation engine, a text in a natural language that includes a description of the malicious activity based on the one or more other computer-based actions;

converting, by the one or more processors, the text into a voice message and sending the voice message to a human analyst, wherein the voice message includes the remedial action for the malicious activity; and receiving, by the one or more processors, an approval of the remedial action, wherein the performing the remedial action is performed automatically in response to the receiving the approval.

2. The method of claim 1, further comprising:
generating, by the one or more processors, an alert that includes the text in the natural language that includes the description of the malicious activity and sending the alert to another computer system for viewing by a human analyst, wherein the alert includes one or more remedial actions for the malicious activity.

3. The method of claim 1, wherein vectorizing each of the first process trees includes mapping the first process trees to first text in the natural language, and wherein the vectorizing the second process trees includes mapping the second process trees to second text in the natural language.

4. The method of claim 1, further comprising:
configuring, by the one or more processors, attributes of the remedial action in a policy; and
determining that an amount of risk associated with the malicious activity exceeds a threshold amount of risk, wherein the performing the remedial action is performed automatically based on the policy and the amount of risk exceeding the threshold amount of risk.

5. The method of claim 1, wherein the performing the remedial action includes proactively preventing subsequent malicious activity by preventing a completion of a subsequent computer process that performs the subsequent malicious activity.

6. The method of claim 1, further comprising:
providing at least one support service for at least one action selected from the group consisting of creating, integrating, hosting, maintaining, and deploying computer readable program code in a computer, the program code being executed by a processor of the computer to implement the identifying the first process trees, vectoring each of the first process trees, associating the vectorized first process trees with respective labels, training the artificial neural network, vectorizing the second process trees, providing the vectorized second process trees as the input vectors, performing the remedial action, determining the language of the first computer process, determining that the language of the first computer process indicates the malicious activity, determining the language of the second computer process, determining that the language of the first computer process matches the language of the second computer process, generating the text in the natural language, converting the text into the voice message, sending the voice message to the human analyst, and receiving the approval of the remedial action.

7. A computer program product for detecting a malicious activity on a computer system, the computer program product comprising:
a computer readable storage medium having computer readable program code stored on the computer readable storage medium, wherein the computer readable storage medium is not a transitory signal per se, the computer readable program code being executed by a central processing unit (CPU) of a first computer system to cause the first computer system to perform a method comprising:
identifying, by the first computer system, first process trees for a plurality of computer processes that have executed on a second computer system;
vectorizing, by the first computer system, each of the first process trees and associating, by the first computer system, the vectorized first process trees with respective labels, each label representing an amount by which a respective vectorized process tree included in the vectorized first process trees reflects the malicious activity;
training, by the first computer system, an artificial neural network by using the vectorized first process trees and the associated labels as training input;
vectorizing, by the first computer system and after a completion of the training of the artificial neural network, second process trees for computer processes that are currently executing on the second computer system, and providing, by the first computer system, the vectorized second process trees as input vectors to the artificial neural network;
in response to the artificial neural network providing an output indicating that a combination of the input vectors indicates the malicious activity, performing, by the first computer system, a remedial action for the malicious activity;
determining, by the first computer system and during the training the artificial neural network, a language of a first computer process based on one or more computer-based actions indicated by one or more sub-trees within a first process tree included in the first process trees, the language of the first computer process including a specification of a first launching application and a first order of first tasks performed by the first computer process;

determining, by the first computer system, that the language of the first computer process indicates the malicious activity;

determining, by the first computer system, a language of a second computer process based on one or more other computer-based actions indicated by one or more other sub-trees within a second process tree included in the second process trees, the language of the second computer process including a specification of a second launching application and a second order of second tasks performed by the second computer process; and determining, by the first computer system, that the language of the first computer process matches the language of the second computer process by determining that the first launching application matches the second launching application and the first order of the first tasks matches the second order of the second tasks, wherein the performing the remedial action is based on the language of the first computer process indicating the malicious activity and matching the language of the second computer process;

based on the language of the second computer process, generating, by the first computer system and using a natural language generation engine, a text in a natural language that includes a description of the malicious activity based on the one or more other computer-based actions;

converting, by the first computer system, the text into a voice message and sending the voice message to a human analyst, wherein the voice message includes the remedial action for the malicious activity; and receiving, by the first computer system, an approval of the remedial action, wherein the performing the remedial action is performed automatically in response to the receiving the approval.

8. The computer program product of claim 7, wherein the method further comprises:

generating, by the first computer system, an alert that includes the text in the natural language that includes the description of the malicious activity and sending the alert to another computer system for viewing by a human analyst, wherein the alert includes one or more remedial actions for the malicious activity.

9. The computer program product of claim 7, wherein the vectorizing each of the first process trees includes mapping the first process trees to first text in the natural language, and wherein the vectorizing the second process trees includes mapping the second process trees to second text in the natural language.

10. The computer program product of claim 7, wherein the method further comprises:

configuring, by the first computer system, attributes of the remedial action in a policy; and determining, by the first computer system, that an amount of risk associated with the malicious activity exceeds a threshold amount of risk, wherein the performing the remedial action is performed automatically based on the policy and the amount of risk exceeding the threshold amount of risk.

11. A first computer system comprising:
a central processing unit (CPU);
a memory coupled to the CPU; and
a computer readable storage medium coupled to the CPU, the computer readable storage medium containing instructions that are executed by the CPU via the memory to implement a method of detecting a malicious activity on a second computer system, the method comprising:

identifying, by the first computer system, first process trees for a plurality of computer processes that have executed on a second computer system;

vectorizing, by the first computer system, each of the first process trees and associating, by the first computer system, the vectorized first process trees with respective labels, each label representing an amount by which a respective vectorized process tree included in the vectorized first process trees reflects the malicious activity;

training, by the first computer system, an artificial neural network by using the vectorized first process trees and the associated labels as training input;

vectorizing, by the first computer system and after a completion of the training of the artificial neural network, second process trees for computer processes that are currently executing on the second computer system, and providing, by the first computer system, the vectorized second process trees as input vectors to the artificial neural network;

in response to the artificial neural network providing an output indicating that a combination of the input vectors indicates the malicious activity, performing, by the first computer system, a remedial action for the malicious activity;

determining, by the first computer system and during the training the artificial neural network, a language of a first computer process based on one or more computer-based actions indicated by one or more sub-trees within a first process tree included in the first process trees, the language of the first computer process including a specification of a first launching application and a first order of first tasks performed by the first computer process;

determining, by the first computer system, that the language of the first computer process indicates the malicious activity;

determining, by the first computer system, a language of a second computer process based on one or more other computer-based actions indicated by one or more other sub-trees within a second process tree included in the second process trees, the language of the second computer process including a specification of a second launching application and a second order of second tasks performed by the second computer process; and determining, by the first computer system, that the language of the first computer process matches the language of the second computer process by determining that the first launching application matches the second launching application and the first order of the first tasks matches the second order of the second tasks, wherein the performing the remedial action is based on the language of the first computer process indicating the malicious activity and matching the language of the second computer process;

based on the language of the second computer process, generating, by the first computer system and using a natural language generation engine, a text in a natural language that includes a description of the malicious activity based on the one or more other computer-based actions;

converting, by the first computer system, the text into a voice message and sending the voice message to a human analyst, wherein the voice message includes the remedial action for the malicious activity; and receiving, by the first computer system, an approval of the remedial action, wherein the performing the remedial action is performed automatically in response to the receiving the approval.

12. The first computer system of claim 11, wherein the method further comprises:

generating, by the one or more processors, an alert that includes the text in the natural language that includes the description of the malicious activity and sending the alert to another computer system for viewing by a human analyst, wherein the alert includes one or more remedial actions for the malicious activity.

13. The first computer system of claim 11, wherein the vectorizing each of the first process trees includes mapping the first process trees to first text in the natural language, and wherein the vectorizing the second process trees includes mapping the second process trees to second text in the natural language.

14. The first computer system of claim 11, wherein the method further comprises:

configuring, by the first computer system, attributes of the remedial action in a policy; and determining, by the first computer system, that an amount of risk associated with the malicious activity exceeds a threshold amount of risk, wherein the performing the remedial action is performed automatically based on the policy and the amount of risk exceeding the threshold amount of risk.

* * * * *